United States Patent Office 2,891,845
Patented June 23, 1959

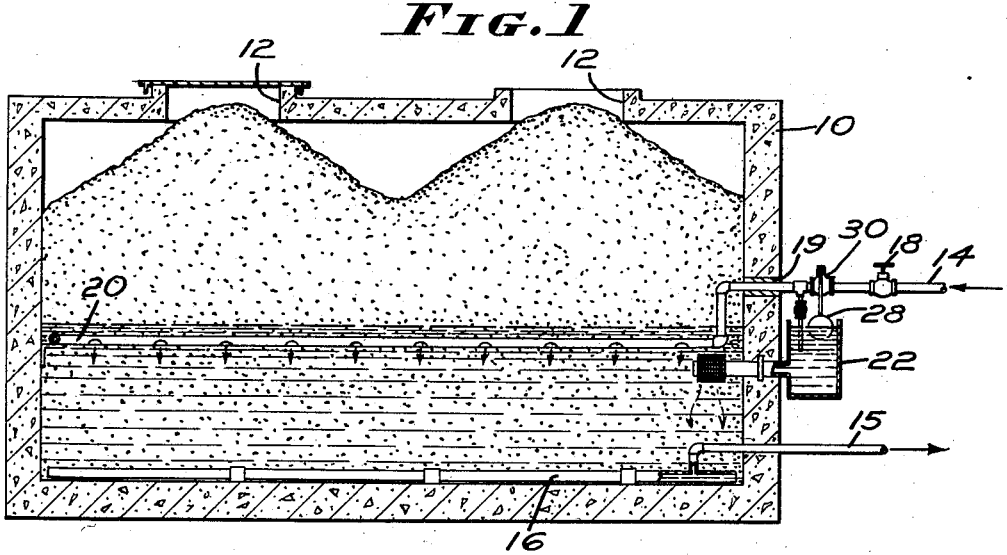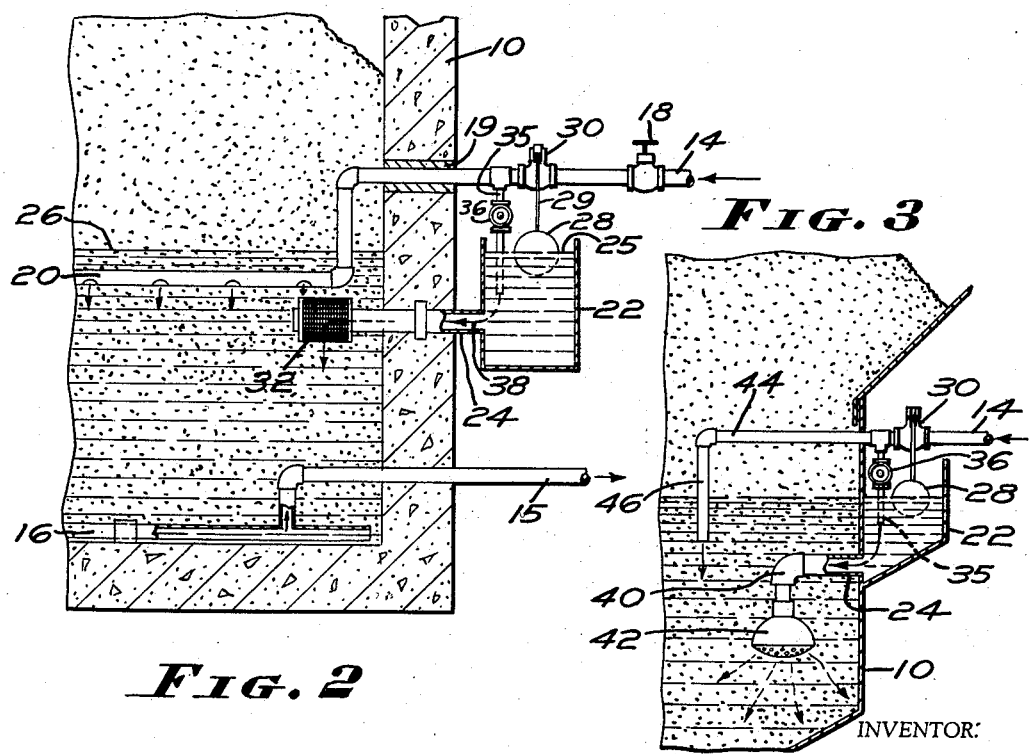

2,891,845
SALT DISSOLVING APPARATUS

Norman M. Agnew, Charlotte, N.C., assignor to International Salt Company, Scranton, Pa.

Application July 18, 1957, Serial No. 672,719

4 Claims. (Cl. 23—272)

This invention relates to improvement in salt dissolving apparatus, for example of the type employed industrially in connection with the production of brine solutions for the various industries. Particularly, the present invention relates to improvements in apparatus of the type disclosed for example in U.S. Patents 1,928,008 and 2,551,494; the present invention being a development of the same proprietary.

As explained in the aforesaid patents, it is a desideratum in such apparatus to maintain a substantially constant level of solute liquid in the dissolver despite or intermittent with the regular withdrawals of brine therefrom; and for this purpose some form of float controlled valve arrangement is usually employed. However, experience has shown that prior float chamber arrangements, while being theoretically suited to provide the desired liquid level control, are actually inaccurate in operation due to either clogging of the brine inlet opening to the float chamber or "loading" of the float device with crystallized salt.

It is a primary object of the present invention to provide an apparatus as aforesaid having improved means for insuring continued optimum operation of the float control device of the apparatus for regulating flow of inlet solute to the apparatus.

Another object of the invention is to provide in conjunction with a float control valve fluid inlet chamber arrangement, improved means operating automatically to maintain the chamber inlet and float and control devices in optimum operating condition throughout continued use of the apparatus without maintenance attention.

Other objects and advantages of the invention will appear in the specification hereinafter.

In the drawings:

Fig. 1 is a sectional view illustrating somewhat diagrammatically a dissolving tank from float chamber and float controlled valve arrangement of the present invention;

Fig. 2 is a fragmentary sectional view, on enlarged scale of the apparatus of Fig. 1; and Fig. 3 is a view corresponding somewhat to Fig. 2, but of a modified form of the liquid elevation control arrangement.

As shown in Figs. 1 and 2, of the drawing herewith, the invention may be incorporated for example in conjunction with a salt dissolving tank illustrated generally at 10 to comprise a concrete tank made of concrete or other suitable material, as may be preferred, and having top inlet ports as indicated at 12—12 through which salt may be periodically or continuously supplied, as may be preferred. A water supply or dilute brine conduit is indicated at 14, and a brine product outlet conduit is indicated at 15; the outlet conduit 15 being illustrated to connect in communication with a brine collecting manifold 16 residing in the bottom portion of the tank 10. As shown in the drawing, the solvent supply conduit 14 may be provided with a manual control valve 18 and extends through a wall portion of the tank 10 as indicated at 19, to deliver fresh solvent through a distributing manifold 20, which is provided with a series of liquid discharge apertures disposed at an appropriate level in the tank so as to distribute the incoming salt solvent at the desired elevation in the tank.

The apparatus for controlling flow of inlet solvent to the tank 10 is illustrated herein by way of example to comprise a "float chamber" indicated at 22 which is arranged to be in open communication with the interior of the tank 10 through means of a conduit connection 24 which extends through the wall of the tank 10. Thus, a liquid level as indicated at 25 within the float chamber 22 will be maintained at an elevation equal with the liquid level within the tank 10, as indicated at 26 (Fig. 2). A float 28 is disposed in the chamber 22 is carried by an arm 29 actuating the flow control valve 30 disposed in the line of the inlet conduit 14; and it will of course be understood that the float and valve devices 28, 30 will be so arranged that the float will operate automatically to regulate the valve 30 so as to maintain the liquid level in the tank 10 at the desired elevation as a function of the liquid level within the chamber 22.

As indicated at 32, the brine inlet conduit to the chamber 22 is provided with a screen at its intake end to prevent entry of solid salt and/or impurity accumulations such as would result from surges of liquid-salt mixtures in the tank due to intermittent movements of the salt bodies in the tank and/or to imperfect operation of the inlet control valve, such as sticking in open position; and/or due to accumulations of crystallized salt in the float would in time tend to plug the conduit 24.

Experience has shown that liberation of oxygen bubbles from the salt brine within the tank 10 and "flotation-like" accumulations of impurities thereon as well as saturated salt crystallization tendencies all tend to operate in relatively short time to clog the interstices of any filter or screen device so used. Although such a screen device may be in place and fully operative, flow of saturated brine into the interior of the float chamber 22 would normally result in deposit of crystallized solid salt upon the float chamber parts including the float 28 per se. Such accumulations on the float 28 would obviously alter its control effects, so as to render them inaccurate.

In accord with the present invention, a fresh solvent conduit as indicated at 35 is connected to the inlet conduit 14 at the downstream side of the control valve 30, and is directed into the float chamber 22. A flow regulating device as indicated at 36 is preferably provided in the line of conduit 35. Thus, whenever the valve 30 is opened by operation of the float 28, fresh solvent flows simultaneously through the by-pass conduit 35 into the float chamber 22 and also through the manifold 20 into the supply of solid salt within the tank 10, until such time as the level liquid in the tank 10 reaches the prescribed elevation thereof. The consequent rise of liquid in the float chamber 22 will then cause the float 28 to rise so as to close the valve 30.

It is a particular feature of the present invention that inasmuch as the float valve device operates periodically to control the liquid flow into the tank, coincident with each fresh solvent inlet operation a supply of fresh solvent is delivered into the float chamber and flows therefrom through the conduit 24 from right to left as viewed in the drawing herewith, and in the direction of the arrow 38 (Fig. 2); whereby the conduit 24 and the screen 32 are both periodically flushed or backwashed with fresh solvent. This constantly recurring treatment of the float chamber and conduit 24 and the screen 32 causes these components of the system to be maintained in optimum operating condition. Also, concomitant with this reverse flow of fresh solvent through the float chamber 22, the brine within the float chamber is thereby periodically diluted so as to maintain it below the saturated solution point; whereby no deposits of crystallized salt tend to accumulate upon the float device 28. Thus, by virtue of the arrangement of the present invention the float device is maintained clear of weight-changing accumulations of crystallized salt; the conduit 24 is maintained in open and unrestricted condition; and the screen 32 is similarly periodically flushed with relatively fresh solution and is thereby maintained in clear and optimum operating condition. Adjustment of the valve 36 will of course regulate the relative rates of flow of fresh solution through the conduit 35 and through the manifold 20, so that any preferred ratio of fresh solvent inlets through the float chamber and through the manifold may be attained.

Fig. 3 illustrates application of the present invention to a somewhat modified form of dissolver apparatus wherein the tank 10 is illustrated to be fabricated of sheet metal or plastic or the like and the float chamber 22 may be formed integrally with and connected in communication with the interior of the tank through means of a conduit or opening 24. At its other end, the conduit 24 is fitted with an elbow 40 leading into a strainer 42. The fresh liquid inlet conduit is illustrated to be connected to a modified form of tank feed conduit 44 which connects to a downwardly directed discharge pipe 46 instead of to a manifold as illustrated in Figs. 1, 2. Thus, it will be appreciated that any desired forms of feed manifold and screen-strainer arrangements may be employed, and that in the form of the apparatus of Fig. 3, the diversion of fresh liquid through the conduit 35 into the float chamber 22 and through the strainer 42, will operate automatically to maintain the float 28 and the strainer 42 in optimum operating condition, incidental to normal operation of the control valve 30 which will thereupon continue to function in optimum manner to maintain the liquid in the tank 10 at the prescribed level.

Whereas the liquid level control component of the apparatus has been illustrated and described as being of the float-controlled valve type, it is to be understood that any other suitable device may be employed such as for example an electrode type level control valve, or the like. In any case the present invention insures optimum operation of the level control unit as explained hereinabove.

Thus, although only a few forms of the invention have been described and illustrated by way of example herein, it will be understood that various changes may be made therein without departing from the spirit of the invention or the scope of the appended claims.

I claim:

1. A salt dissolving apparatus comprising a tank for salt to be dissolved, a brine outlet conduit adjacent the bottom level of said tank, a fresh solvent inlet conduit connected to a pressured solvent supply and comprising a closed conduit extending from said supply to discharge position interiorly of said tank and arranged to discharge fresh solvent into said tank at an elevation above said outlet conduit, a float chamber separate from the interior of said tank and having an open connection therewith, whereby liquid within said tank and within said float chamber tend to seek the same level, a screen device in said tank guarding the inlet end of the open connection into said float chamber, a float device disposed within said float chamber and operably coupled to a valve controlling flow of said fresh solvent through said closed conduit, whereby alternate rising and falling of said float responsive to changes of the liquid level within said float chamber will actuate said valve to regulate flow of fresh solvent through said conduit into said tank, a fresh solvent bleed-off conduit connected to said first mentioned inlet conduit at the downstream side of said valve and discharging into said float chamber, whereby whenever said valve is opened a supply of fresh solvent flows into said tank and simultaneously into said float chamber and from thence into said tank thereby operating to reduce the degree of salt concentration in the liquid within said chamber and to back wash said screen device.

2. A salt dissolving apparatus comprising a tank for salt to be dissolved, a brine outlet conduit leading from said tank, a fresh solvent inlet conduit connected to a pressured solvent supply and comprising a closed conduit extending from said supply to discharge position interiorly of said tank and arranged to discharge solvent into said tank, a liquid level control chamber separate from the interior of said tank and having an open conduit connection therewith, whereby liquid within said tank and within said chamber tend to seek the same level, a screen device guarding the tank end of the open conduit connecting to the chamber, a control device disposed within said chamber and operably coupled to a valve controlling flow through said fresh solvent inlet conduit, whereby alternate rising and falling of the liquid level within said chamber will control said valve to regulate flow of fresh solvent through said conduit into said tank, a fresh solvent by-pass conduit connected to said first mentioned inlet conduit at the downstream side of said valve and discharging into said chamber, whereby whenever said valve is open a supply of fresh solvent flows into said chamber to reduce the degree of salt concentration in the liquid therewithin and then flows therefrom through said open conduit and thus operates to flush said screen device.

3. A salt dissolving apparatus comprising a vessel holding salt to be dissolved, a brine outlet conduit leading from said vessel, a fresh solvent inlet conduit connected to a pressured solvent supply and comprising a closed conduit extending from said supply to discharge position interiorly of said tank and arranged to discharge solvent into said vessel, a liquid level control chamber separate from the interior of said vessel and having an open liquid connection therewith, whereby liquid within said vessel and within said chamber tend to seek the same level, a screen device guarding the tank end of the opening connecting to the chamber, a control device disposed within said chamber and operably coupled to a valve controlling flow of fresh solvent through said inlet conduit, whereby alternate rising and falling of the liquid level within said chamber will control said valve to regulate flow of fresh solvent through said closed conduit into said vessel, a fresh solvent open end conduit connected to said first mentioned closed inlet conduit at the downstream side of said valve and discharging into said chamber, whereby whenever said valve is open a supply of fresh solvent flows into said chamber to reduce the degree of salt concentration in the liquid therewithin and thence into said tank and thus operates to flush said screen device.

4. A salt dissolving apparatus comprising a tank for salt to be dissolved, a brine outlet conduit leading from said tank, a fresh solvent inlet conduit connected to a pressured solvent supply and comprising a closed conduit extending from said supply to discharge position interiorly of said tank, a level control chamber separate from the interior of said tank and having a liquid passage connection therewith, whereby the liquid level within said tank and within said chamber varies as a function of the level of liquid in said tank, a screen device guarding the tank end of the liquid passage connection to said chamber, a control device disposed within said chamber and operably coupled to a valve controlling said fresh solvent inlet conduit whereby alternate rising and falling of the liquid level within said chamber will actuate said valve to regulate flow of fresh solvent through said closed conduit, said inlet conduit having a branch portion thereof at the downstream side of said valve discharging into said chamber, whereby whenever said valve is opened a supply of fresh solvent flows into said chamber and operates to reduce the degree of salt concentration in the liquid therewithin and operates to back wash said screen device.

References Cited in the file of this patent

UNITED STATES PATENTS

| | | |
|---|---|---|
| 2,536,934 | Hinrichs | Jan. 2, 1951 |
| 2,614,032 | Eichstaedt | Oct. 14, 1952 |